United States Patent
Zhang et al.

(10) Patent No.: US 9,460,098 B2
(45) Date of Patent: Oct. 4, 2016

(54) VIRTUAL MACHINE SNAPSHOT BACKUP BASED ON MULTILAYER DE-DUPLICATION

(71) Applicant: Alibaba Group Holding Limited, Grand Cayman (KY)

(72) Inventors: Wei Zhang, Santa Clara, CA (US); Hong Tang, Santa Clara, CA (US); Hao Jiang, Santa Clara, CA (US); Yue Zeng, Santa Clara, CA (US); Xiaogang Li, Santa Clara, CA (US)

(73) Assignee: ALIBABA GROUP HOLDING LIMITED, Grand Cayman (KY)

( * ) Notice: Subject to any disclaimer, the term of this patent is extended or adjusted under 35 U.S.C. 154(b) by 208 days.

(21) Appl. No.: 13/967,939

(22) Filed: Aug. 15, 2013

(65) Prior Publication Data

US 2014/0052692 A1    Feb. 20, 2014

(30) Foreign Application Priority Data

Aug. 15, 2012    (CN) .......................... 2012 1 0291388

(51) Int. Cl.
    *G06F 17/30*    (2006.01)
    *G06F 11/14*    (2006.01)

(52) U.S. Cl.
    CPC ..... *G06F 17/30088* (2013.01); *G06F 11/1453* (2013.01); *G06F 2201/815* (2013.01); *G06F 2201/84* (2013.01)

(58) Field of Classification Search
    CPC .................... G06F 17/30088; G06F 17/30575
    USPC ....................................................... 707/639
    See application file for complete search history.

(56) References Cited

U.S. PATENT DOCUMENTS

| | | |
|---|---|---|
| 8,055,937 B2 | 11/2011 | Goroff et al. |
| 8,190,835 B1 | 5/2012 | Yueh |
| 8,239,584 B1 | 8/2012 | Rabe et al. |
| 8,315,985 B1 | 11/2012 | Ohr et al. |
| 8,332,689 B2 | 12/2012 | Timashev et al. |
| 8,364,716 B2 | 1/2013 | Gaonkar et al. |
| 8,402,309 B2 | 3/2013 | Timashev et al. |
| 8,417,938 B1 | 4/2013 | Considine et al. |
| 8,423,726 B2 | 4/2013 | Yueh |
| 8,543,609 B1 | 9/2013 | Natanzon |
| 8,566,640 B2 | 10/2013 | Timashev et al. |
| 8,578,076 B2 | 11/2013 | Van Der Linden et al. |

(Continued)

FOREIGN PATENT DOCUMENTS

CN    101916171 A    12/2010

OTHER PUBLICATIONS

Amazon.com, "Amazon EBS Product Details", Website. Mar. 19, 2016 <https://aws.amazon.com/ebs/details/>.

(Continued)

*Primary Examiner* — Apu Mofiz
*Assistant Examiner* — Cindy Nguyen
(74) *Attorney, Agent, or Firm* — Anova Law Group, PLLC

(57) ABSTRACT

The present disclosure provides an example method and system for virtual machine backup based on multilayer de-duplication. A virtual machine snapshot is divided into multiple child data blocks. Each child data block is divided into multiple data segments. Multilayer de-duplication is applied to the virtual machine snapshot to exclude data causing duplicate backup in the virtual machine snapshot. The remaining virtual machine snapshot data after the processing of the multilayer de-duplication is stored.

18 Claims, 4 Drawing Sheets

(56) References Cited

U.S. PATENT DOCUMENTS

| | | |
|---|---|---|
| 8,650,162 B1 * | 2/2014 | Vaikar et al. .................. 707/692 |
| 8,712,962 B1 | 4/2014 | Natanzon et al. |
| 8,719,286 B1 | 5/2014 | Xing et al. |
| 8,751,515 B1 | 6/2014 | Xing et al. |
| 8,880,474 B2 | 11/2014 | Mason et al. |
| 8,880,824 B1 | 11/2014 | Yueh |
| 8,898,114 B1 * | 11/2014 | Feathergill et al. .......... 707/648 |
| 8,898,402 B1 | 11/2014 | Stronge |
| 8,914,595 B1 | 12/2014 | Natanzon |
| 8,918,378 B1 | 12/2014 | Faith et al. |
| 8,996,460 B1 | 3/2015 | Frank et al. |
| 9,053,339 B2 | 6/2015 | Pate et al. |
| 9,063,938 B2 | 6/2015 | Kumarasamy et al. |
| 9,104,331 B2 | 8/2015 | Hsu |
| 9,110,604 B2 | 8/2015 | Hsu |
| 9,189,294 B2 | 11/2015 | Considine et al. |
| 9,250,813 B2 | 2/2016 | Oshima et al. |
| 9,274,824 B2 | 3/2016 | Blake et al. |
| 2009/0249006 A1 | 10/2009 | Boldt et al. |

OTHER PUBLICATIONS

Newgensoft, "Enterprise Content Management Suite Menu", Website. Mar. 19, 2016 <http://www.newgensoft.com/products/enterprise-content-management-omnidocs/>.

* cited by examiner

VIRTUAL MACHINE SNAPSHOT BACKUP BASED ON MULTILAYER DE-DUPLICATION

CROSS REFERENCE TO RELATED PATENT APPLICATIONS

This application claims foreign priority to Chinese Patent Application No. 201210291388.6 filed on 15 Aug. 2012, entitled "Method and System of Virtual Machine Snapshot Backup Based on Multilayer De-duplication," which is hereby incorporated by reference in its entirety.

TECHNICAL FIELD

The present disclosure relates to the field of computers, and more specifically, to a method and a system for virtual machine snapshot backup based on multilayer de-duplication.

BACKGROUND

A conventional virtual machine system provides system snapshot service to users. That is, a complete snap shot is conducted to a virtual machine disk image. A virtual machine snapshot backup system is a sub-system of the virtual machines system and manages all historical data of a virtual machine user at PB level. Thus, increasing storage efficiency of the virtual machine snapshot backup system is very important to reduce virtual machine usage costs for the users and increase storage utilization efficiencies of machine clusters.

To handle large-scale data backup requests in real-time and efficiently exclude duplicate data, the virtual machine snapshot backup system may need to meet at least three conditions. The first one is a high data processing speed such that backup of thousands of virtual machines can be completed within three hours at night every day. The second one is an excellent de-duplication effect to exclude most redundant data (such as removing at least 70% redundant data). The third one is low resource utilization. The virtual machine snapshot system, as the sub-system of the virtual machine system, cannot compete with other important modules of the virtual machine system for resources. Otherwise, user experience of the virtual machine would be affected.

One example conventional technique for de-duplication of the virtual machine snapshot backup is an EBS snapshot store technique which is provided by a cloud computing platform of Amazon™. Details please see http://aws.amazon.com/ebs/. The technique divides each virtual machine disk into a fixed size block with 4 MB and tracks change information of each block during usage. If one block is determined as having no change as of preceding backup snapshot, such a block of data is not backed. Another example conventional technique is a backup de-duplication storage server provided by the special storage technology provider such as ECM™, which divides the backup data into various data block according to content characteristics and detects the redundant data according to Hash check.

The technique of Amazon™ determines the data for backup solely based data revision record of a single virtual machine. It has at least the following disadvantages. First, even though the data in the block is only revised by one byte, the whole data needs backing up. In addition, with respect to the scenario that different users back up the same data, such as an operating system and various frequently used applications, disk location of such data may be not uniform due to differences of user behaviors. The technique of Amazon™ cannot detect such kind of redundant data.

Although the technique of EMC™ may exclude redundant data according to data characteristics, the price of its special storage server is very high and cannot meet the backup requirements of virtual machine clusters at TB level. Neither are such techniques compatible with the cloud computing system with cheap price and huge data volume.

SUMMARY

This Summary is provided to introduce a selection of concepts in a simplified form that are further described below in the Detailed Description. This Summary is not intended to identify all key features or essential features of the claimed subject matter, nor is it intended to be used alone as an aid in determining the scope of the claimed subject matter. The term "techniques," for instance, may refer to apparatus(s), system(s), method(s) and/or computer-readable instructions as permitted by the context above and throughout the present disclosure.

The present disclosure provides an example method for virtual machine backup based on multilayer de-duplication. A virtual machine snapshot is divided into multiple child data blocks. Each child data block is divided into multiple data segments. Multilayer de-duplication is applied to the virtual machine snapshot to exclude data causing duplicate backup in the virtual machine snapshot. The remaining virtual machine snapshot data after the processing of the multilayer de-duplication is stored.

For example, the multilayer de-duplication of the virtual machine snap shot may include the following. De-duplication of the child data blocks, de-duplication of the data segments, and de-duplication of a public data set are applied to the virtual machine snap shot. The public data set centrally stores one or more data segments whose repetition rates are higher than a preset threshold in a backup storage file system.

For example, the de-duplication of the child data blocks may include the following operations. It is determined whether there is any change of the child data blocks since a preceding backup. Unchanged child data blocks are excluded and changed child data blocks are reserved.

For example, the de-duplication of the data segments may include the following operations. It is determined whether remaining data segments in the changed child data blocks after the de-duplication of the child data blocks have changed since the preceding backup. Unchanged data segments are excluded and changed data segments are reserved.

For example, the de-duplication of the public data set may include the following operations. One or more characteristics of the changed data segments remaining after the de-duplication of the data segments are compared with one or more characteristics of data in the public data set to determine whether the changed data segments exist in the public data set. A data segment that is determined to exist in the public data set is excluded.

For example, the operation for dividing each child data block into the multiple data segments may include the following. Each child data block is divided into multiple data segments with variant lengths or sizes.

For example, the virtual machine snap shot includes data fingerprints, data sizes and data pointers of the child data blocks. Each child data block includes data fingerprints, data sizes and data pointers of the child data blocks of the data segments.

For example, the example method may further include the following operations. The backup storage file system is periodically scanned. Based on data repetition characteristics of data storage, data whose repetition rate is higher than a preset threshold is saved into the public data set.

For example, the example method may further include the following operations. With respect to the data that has been excluded by the multilayer de-duplication, index of corresponding data in a previous virtual machine snap shot may be directly cited by the current virtual machine snap shot.

For example, the example method may further include performing a rollover of snapshot. An index of child data blocks is read from the backup storage file system according to an index of a to-be-rollover snapshot of the virtual machine. The data segments are read according to the index of the child data blocks. The read data segments are formed into the child data blocks. The formed child data blocks are formed into the to-be-rollover snapshot. By reference to revision information of the current virtual machine mirror file and the index information of the to-be-rollover snapshot, common data in the current virtual machine mirror file and the to-be-rollover snapshot is determined. The common data is not necessary to be read from the backup storage file system.

For example, the example method may further include deleting the snapshot. Deletion information of an index of to-be-deleted snapshot of the virtual machine is written into a log. When deletion information volume in the log is larger than a preset threshold, the backup data of the virtual machine is scanned to find child data block and data segments that have not been referenced for a certain period of time and delete them.

The present disclosure also provides an example system for virtual machine backup based on multilayer de-duplication, which may include a snapshot division module, a snapshot multilayer de-duplication module, and a snapshot backup storage module. The snapshot division module divides a virtual machine snapshot into multiple child data blocks and divides each child data block into multiple data segments. The multilayer de-duplication module applies multilayer de-duplication to the virtual machine snapshot to exclude data causing duplicate backup in the virtual machine snapshot. The snapshot backup storage module stores remaining snapshot data after the processing of the multilayer de-duplication.

For example, the example system may further include a scan module, a snapshot rollover module, and a snapshot deletion module.

The present techniques use the multilayer de-duplication techniques, based on distribution characteristics of repetition times of data segments stored in large-scale data, efficiently and effectively exclude backing up certain data, thereby using less resources to achieve de-duplication effects.

BRIEF DESCRIPTION OF THE DRAWINGS

To better illustrate embodiments of the present disclosure, the following is a brief introduction of the FIGs to be used in the description of the embodiments. It is apparent that the following FIGs only relate to some embodiments of the present disclosure. A person of ordinary skill in the art can obtain other FIGs according to the FIGs in the present disclosure without creative efforts. The example embodiments and their specifications are used to illustrate the present disclosure and shall not constitute inappropriate restrictions to the present disclosure.

DETAILED DESCRIPTION

Under the present techniques, a virtual machine snapshot is divided into multiple child data blocks. Each child data block is divided into multiple data segments. Multilayer de-duplication is applied to the virtual machine snapshot.

For example, the multilayer de-duplication of the virtual machine snap shot may include the following. De-duplication of the child data blocks, de-duplication of the data segments, and de-duplication of a public data set are applied to the virtual machine snap shot one-by-one to exclude data that may cause duplicate backup in the virtual machine snapshot. The public data set centrally stores one or more data segments whose repetition rates are higher than a preset threshold in a backup storage file system and virtual machine snapshot data remaining after the processing of the multilayer de-duplication.

To better illustrate the present techniques, the present disclosure is described by reference to the FIGs. The present disclosure provides an example method and system for virtual machine backup based on multilayer de-duplication.

Figure 1:
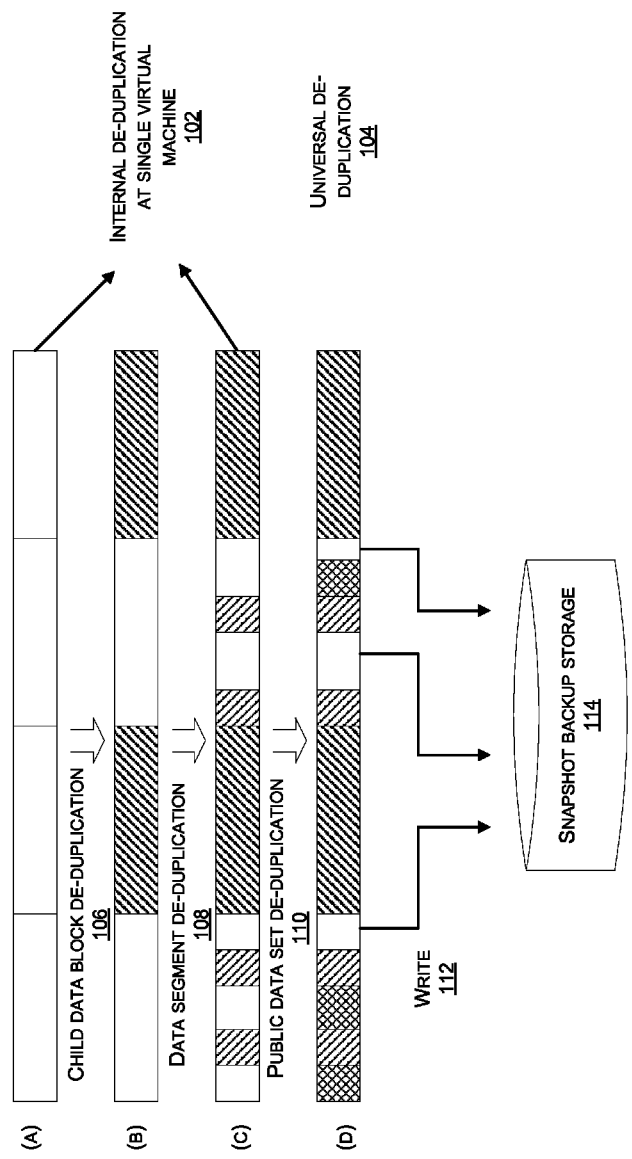
FIG. 1 is a diagram of an example implementation of virtual snapshot backup based on multilayer de-duplication in accordance with an example embodiment of the present disclosure.

FIG. 1 is a diagram of an example implementation of virtual snapshot backup based on multilayer de-duplication in accordance with an example embodiment of the present disclosure.

As shown in FIG. 1, in accordance with an example method for virtual machine backup based on multilayer de-duplication, the virtual machine snapshot is divided into multiple child blocks to be ready for multilayer de-duplication. From the perspective of implementation, the multilayer de-duplication may be divided into three levels. Most redundant data of each level is excluded at such level based on specific information to reduce the burden of de-duplication at a next level. From the perspective of logics, the first two levels are directed to internal de-duplication of backup data of a single virtual machine and are mainly to filter unchanged data as of preceding backup. A third level is to exclude data that has a high repetition rate from the respective of a universal de-duplication 104. The implementation is generally described by reference to FIG. 1.

Firstly, a child data block de-duplication 106 is implemented from (a) to (b). For example, this level may use visiting information recorded by one or more virtual disks to determine portions of the virtual disks that have not changed since the preceding backup. For those unchanged portions, a new snapshot index directly links to child data block contents of last snapshot. Those child data blocks that are already marked as revised are further processed by a next level de-duplication.

Secondly, with respect to data after the child data block de-duplication 108, a data segment de-duplication 108 from (b) to (c) is implemented. This level is mainly directed to those unrevised or unchanged data in the child data blocks which are marked as "revised." For example, a variant length cutting algorithm based on data content characteristics may be used to cut a respective child data block into hundreds of data segments. Based on an index of a corresponding child data block in a previous snapshot at a location of a current child data block, data fingerprint of the two child data blocks are compared to determine which data segments are revised. With respect to those same data segments that are found from the previous snapshot, the index of the current child data block may directly link to them.

With respect to data after the above two levels of de-duplication, a public data set de-duplication 110 from (c) to (d) is implemented. This level is mainly directed to the data segments that are determined as revised at a previous level. For example, hash values of contents of all data segments entered into this level are sent to a cache of a distributive public data set for inquiry. If it is found that a respective data segment belongs to the public data set, it is not necessary to save another copy. Otherwise, the respective data segment is used as new data to be submitted to a snapshot backup storage module. In other words, virtual snapshot data after the above multiple levels of de-duplication are written 112 into a snapshot backup storage 114.

For example, the snapshot may include respective data fingerprints, data sizes and data pointers of one or more child data blocks. Each child data block may include respective data fingerprints, data sizes and data pointers of the child data blocks of one or more data segments. Between snapshots of a respective virtual machine, if one or more child data blocks or data segments are determined as having the same contents, a current snapshot will use or link to data of a previous snapshot without redundant storage. Unless specified otherwise, snapshots, virtual snapshots, and virtual machine snapshots may have similar meanings in the present disclosure. A data pointer may refer to a physical storage location of data. For example, the data pointer may be represented as <file name, initial deviation> to indicate the storage location. Alternatively, a key in key-value (KV) service may be used as the data pointer to indicate the storage location.

Figure 2:
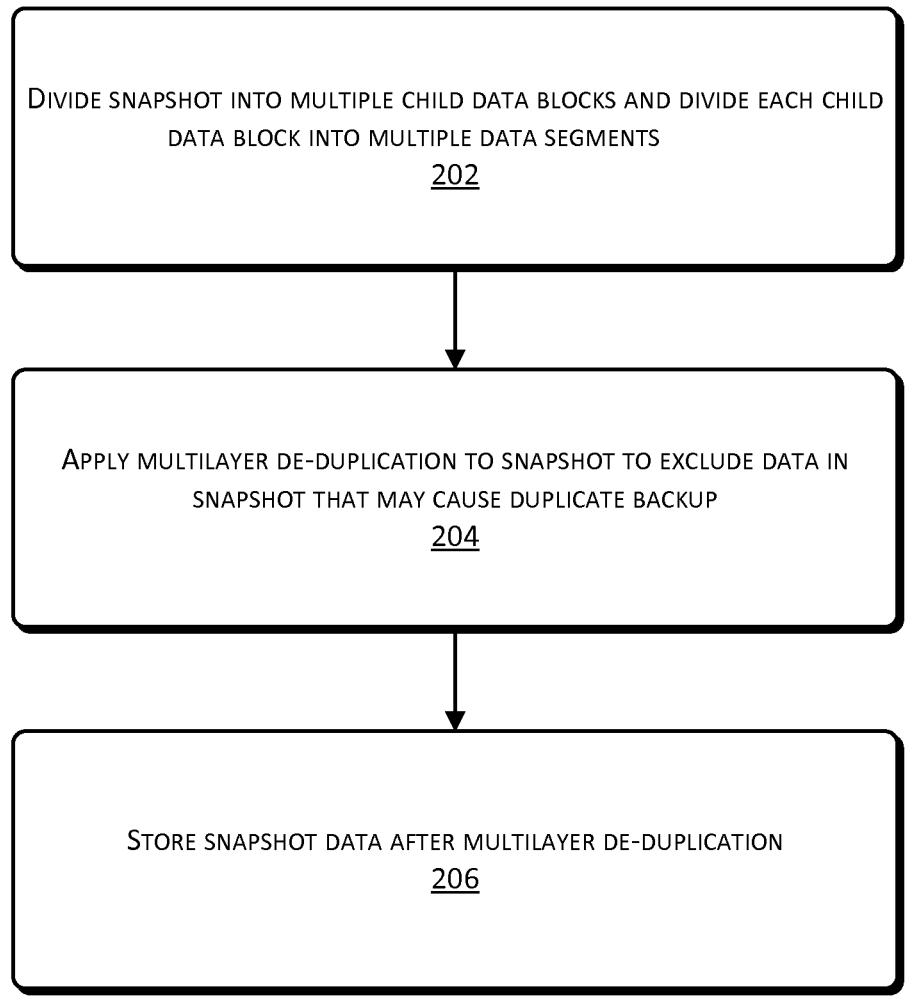
FIG. 2 is a flow chart of an example method for virtual machine snapshot backup based on multilayer de-duplication in accordance with the example embodiment of the present disclosure.

FIG. 2 illustrates a flow chart of the example method for virtual machine snapshot backup based on multilayer de-duplication in accordance with the example embodiment of the present disclosure.

At 202, a snapshot is divided into multiple child data blocks and each child data block is divided into multiple data segments. For instance, the child data blocks may have fixed lengths while the data segments may have variant lengths. Optionally, a respective child data block may be divided into multiple data segments with multiple different lengths based on characteristics of data contents.

For example, a snapshot may be divided into multiple child data blocks with megabytes (MB) size. Optionally, the snapshot may be divided into multiple child data blocks with megabytes (MB) size and each child data block may be divided into multiple data segments with variant kilobytes (KB) sizes based on a cutting algorithm based on data content characteristics. For example, the snapshot may include respective data fingerprints, data sizes and data pointers of one or more child data blocks. Each child data block may include respective data fingerprints, data sizes and data pointers of the child data blocks of one or more data segments.

At 204, multilayer de-duplications are applied to the snapshot to exclude data in the snapshot that may cause duplicate backup. For example, a three level de-duplication, such as de-duplication of the child data blocks, de-duplication of the data segments, and de-duplication of a public data set may be applied. The public data set centrally stores one or more data segments whose repetition rates are higher than a preset threshold in a backup storage file system.

For example, a first level of de-duplication may be firstly implemented. That is, the de-duplication of the child data blocks may be implemented. It is determined whether there is any change of the child data blocks since a preceding backup. Unchanged child data blocks are excluded and changed child data blocks are reserved. The changed child data blocks are used in the de-duplication of the data segments.

In other words, the first level of de-duplication may, for example, use visiting information recorded by one or more virtual machine disk mirrors to compare child data blocks of a current snapshot with child data blocks of a previous snapshot by using a respective child data block as a unit. Child data bocks with the same contents in the current snapshot and the previous snapshot are determined as unchanged child data blocks to be excluded. Thus, unchanged child data blocks are excluded after the first level of de-duplication.

Secondly, a second level of de-duplication may be implemented. That is, the de-duplication of the data segments may be implemented. It is determined whether data segments in the child data blocks that remain after the de-duplication of the child data blocks have changed since the preceding backup. Unchanged data segments are excluded and changed data segments are reserved. The changed data segments may be used in the de-duplication of the public data set.

In other words, the second level of de-duplication may, for example, based on an index of a corresponding child data block in the previous snapshot at a location of a current child data block remaining after the de-duplication of the child data blocks by using a respective data segment as a unit, compare the data segments in the current snapshot after the first level of de-duplication with the data segments in the previous snapshot. Data segments with the same contents are determined as unchanged data segments to be excluded. Thus, unchanged data segments are excluded after the second level of de-duplication.

Then, a third level of de-duplication is implemented. That is, a de-duplication of the public data set is implemented. One or more characteristics of the changed data segments remaining after the de-duplication of the data segments are compared with one or more characteristics of data in the public data set to exclude data segments that are determined to be existent in the public data set and to preserve data segments that are non-existent in the public data set. Data segments remaining after the multilayer de-duplication are backed up.

In other words, at the third level of de-duplication, the data fingerprints of the data segments in the current snapshot remaining after the above two levels of de-duplication may be calculated by using an algorithm such as SHA1 hash algorithm. Such hash values are sent to a cache of a distributive public data set for inquiry. The data segments that are existent in the public data set are determined to be unchanged data segments. Such unchanged data segments are to be excluded. Thus, unchanged data segments are excluded at the third level of de-duplication. The data segments remaining after the multilayer de-duplications are stored for backup.

At 206, snapshot data remaining after the multilayer de-duplications are stored.

For example, the data excluded from the multilayer de-duplications may be directly referred to an index of corresponding data in the previous snapshot.

For example, the example method may further include performing a rollover of a snapshot. An index of child data blocks is read from the backup storage file system according to an index of a to-be-rollover snapshot of the virtual machine. The data segments are read according to the index of the child data blocks. The read data segments are formed into the child data blocks. The formed child data blocks are formed into the to-be-rollover snapshot. By reference to revision information of the current virtual machine mirror file and the index information of the to-be-rollover snapshot, common data in the current virtual machine mirror file and the to-be-rollover snapshot is determined. The common data is not necessary to be read from the backup storage file system.

For example, the example method may further include deleting the snapshot. Deletion information of an index of the to-be-deleted snapshot of the virtual machine is written into a log. When deletion information volume in the log is larger than a preset threshold, the backup data of the virtual machine is scanned to find child block data and data segments that have been referenced for a certain period of time and delete them. For instance, when the deletion information volume in the log is higher than 50% of total information in the snapshot, the backup data of the virtual machine is scanned to find child data blocks and data segments that have not been reference in, for example, 14 days or 30 days. Such found child data blocks and data segments are then deleted.

Figure 3:
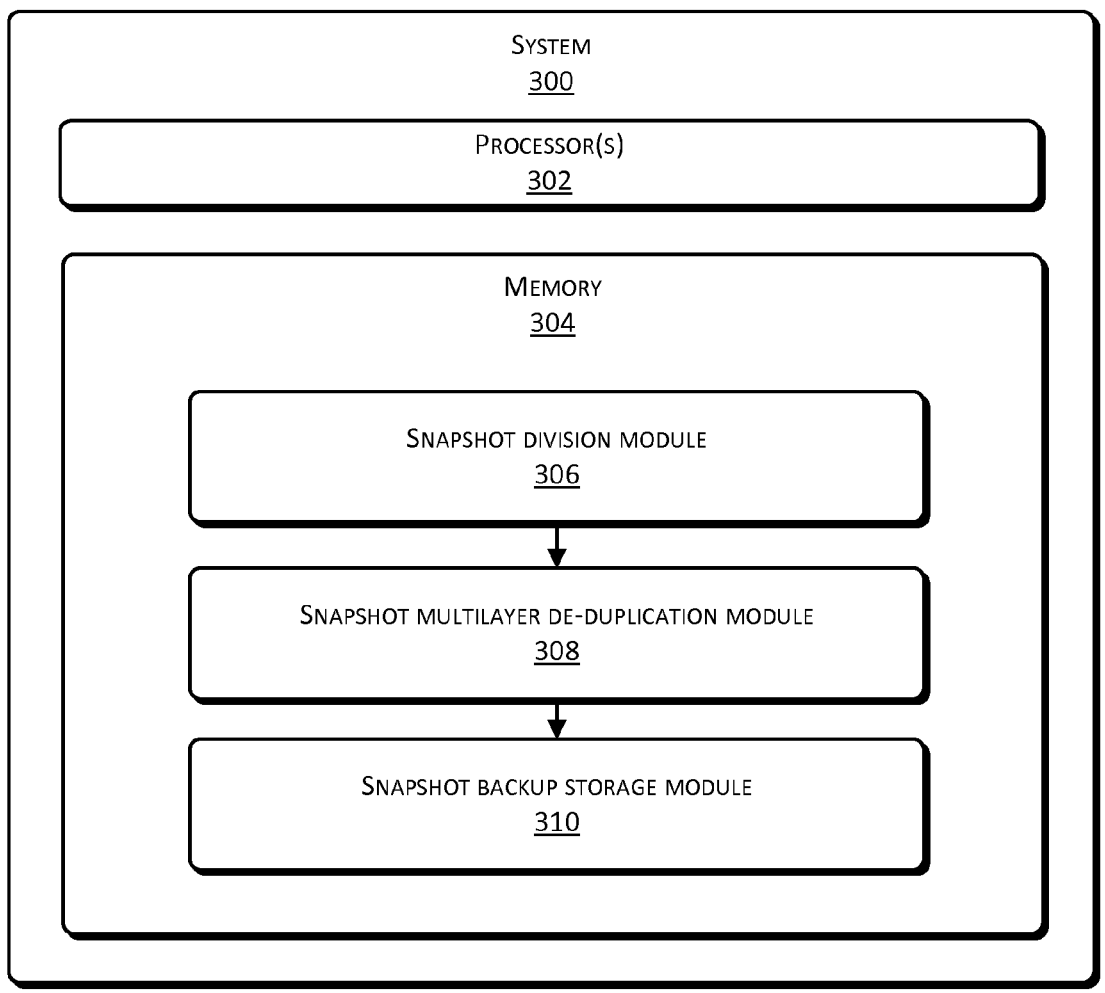
FIG. 3 is a diagram of an example system for virtual machine snapshot backup based on multilayer de-duplication in accordance with the example embodiment of the present disclosure.

FIG. 3 is a diagram of an example system Snap for virtual machine snapshot backup based on multilayer de-duplication in accordance with the example embodiment of the present disclosure.

The example system 300 may include one or more processor(s) 302 and memory 304. The memory 304 is an example of computer-readable media. As used herein, "computer-readable media" includes computer storage media and communication media.

Computer storage media includes volatile and non-volatile, removable and non-removable media implemented in any method or technology for storage of information such as computer-executed instructions, data structures, program modules, or other data. In contrast, communication media may embody computer-readable instructions, data structures, program modules, or other data in a modulated data signal, such as a carrier wave. As defined herein, computer storage media does not include communication media. The memory 304 may store therein program units or modules and program data.

In the example of FIG. 3, the memory 304 may store therein a snapshot division module 306, a snapshot multilayer de-duplication module 308, and a snapshot backup storage module 310. The snapshot division module 306 divides a virtual machine snapshot into multiple child data blocks and divides each child data block into multiple data segments. The multilayer de-duplication module 308 applies multilayer de-duplication to the virtual machine snapshot to exclude data causing duplicate backup in the virtual machine snapshot. The snapshot backup storage module 310 stores snapshot data remaining after the processing of the multilayer de-duplication.

Figure 4:
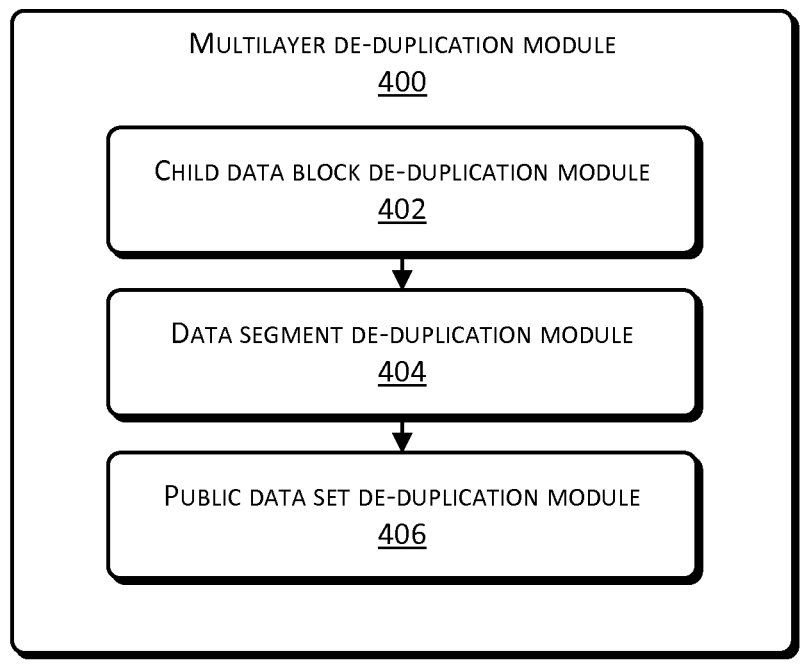
FIG. 4 is a diagram of an example snapshot multilayer de-duplication module in the example system as shown in FIG. 3.

For example, the multilayer de-duplication module 308 implements multilayer de-duplication, which may include two or more de-duplication sub-modules. FIG. 4 illustrates a diagram of an example multilayer de-duplication module 400. The multilayer de-duplication module 400 includes a child data block de-duplication module 402, a data segment de-duplication module 404, and a public data set de-duplication module 406. The public data set centrally stores one or more data segments whose repetition rates are higher than a preset threshold in a backup storage file system.

For example, the child data block de-duplication module 402 may determine whether one or more child data blocks have changed since the preceding backup, exclude one or more determined unchanged child data blocks, and keep one or more determined changed child data blocks.

For example, the data segment de-duplication module 404 may determine whether one or more data segments in the one or more child data blocks remaining after the child data block de-duplication have changed since the preceding backup, exclude one or more determined unchanged data segments, and keep one or more determined changed data segments.

For example, the public data set de-duplication module 406 may compare one or more characteristics of the changed data segments remaining after the data segment de-duplication with one or more characteristics of data in the public data set to exclude data segments that are determined to be existent in the public data set and to preserve data segments that are not existent in the public data set.

In accordance with the example embodiment, the system 300 may further include a scan module, a snapshot rollover module, and a snapshot deletion module (not shown in the FIGs).

For example, the scan module may periodically scan the backup storage file system and, based on data repetition characteristics of data storage, save data whose repetition rate is higher than a preset threshold into the public data set. For instance, the scan module may scan the data and, based on features of Zipf distribution of repetitive data characteristic in large-scale data storage, extract a batch of data with a highest repetitive rate into the public data set.

For example, the snapshot rollover module may read an index of child data blocks read from the backup storage file system according to an index of a to-be-rollover snapshot of the virtual machine, and read the data segments according to the index of the child data blocks. The snapshot rollover module may also form the read data segments into the child data blocks and form the formed child data blocks into the to-be-rollover snapshot. The snapshot rollover module may, by reference to revision information of the current virtual machine mirror file and the index information of the to-be-rollover snapshot, determine common data in the current virtual machine mirror file and the to-be-rollover snapshot. The common data is not necessary to be read from the backup storage file system.

For example, the snapshot deletion module may write deletion information of the index of to-be-deleted snapshot of the virtual machine into a log. When deletion information volume in the log is larger than a preset threshold, the snapshot deletion module may scan the backup data of the virtual machine to find child block data and data segments that have not been referenced for a certain period of time and delete them.

The detailed implementations of the modules included in the system 300 of the present disclosure correspond to those the operations in the example method. For the purpose of brevity, detailed implementations of the modules are not described herein.

The present techniques may eliminate duplicate backup of frequently used data based on the features of Zipf distribution in repetitive times of data segments in large-scale data storage to use limited resources to maximize the de-duplication effects. The virtual machine backup storage system periodically performs scanning tasks of universal data segments to calculate appearance frequencies of the data child data blocks. Based on resource restrictions of an actual system, the resent techniques introduce the data segments with high rankings into the public data set. Hash vales of contents of the data segments in the public data set are stored in the cache of the distributive public data set as an index of the inquiry at the third level of de-duplication.

One of ordinary skill in the art would understand that the modules and operations as described in the present disclosure may be implemented by hardware, computer software, or a combination thereof. To illustrate the interchangeability between hardware and software, the present disclosure generally describes components and operations in each example embodiment according to their functionalities. Whether such functionalities are implemented by hardware or software is dependent on specific applications of technical solutions and design constraints. One of ordinary skill in the art would use different methods for different specific application scenarios to implement the described functionalities. Such implementation shall not be deemed as out of the protection scope of the present disclosure.

The present techniques may be implemented through hardware, software, or a combination thereof. The hardware may be implemented by specific logic. The software may be stored at one or more computer storage media and implemented by a proper instruction implementation system such as one or more processors or specifically designed processing device. One of ordinary skill in the art would understand that the above devices, systems, and methods can be implemented by computer-executable instructions and/or control codes embedded in the processors. For example, disk, CD or DVE-Rom, read-only memory (ROM), programmable read-only memory (PROM) or any other optical or electronic signal carrier media may store such instructions or codes. The devices and their modules may be implemented by very-large-scale integrated circuit or gate array, semiconductors such as logic circuits or transistors, or circuits of programmable hardware device such as field Programmable Gate Array (FPGA), programmable logic device, any other computer-executable instruction executed by the processors, or a combination of any of the above hardware circuits and software.

Although the present disclosure describes several modules or sub-modules of the devices, a division of such modules or sub-modules are not mandatory. For example, functionalities and characteristics of two or more modules may be integrated into one module. Functionalities and characteristics of one module may be further divided into multiple modules.

Although the present disclosure and the FIGs describe operations in certain sequence, it does not require or imply that the operations have to be implemented according to such sequences or all operations have to be implemented to achieve the desired result. In contrast, some steps in the FIGs may have different implementing sequences. Additionally or optionally, some operations may be omitted; multiple steps may be integrated into one step; or one step is divided into multiple steps.

The above descriptions illustrate example embodiments of the present disclosure. The embodiments are merely for illustrating the example embodiments and are not intended to limit the scope of the present disclosure. It should be understood by one of ordinary skill in the art that certain modifications, replacements, and improvements can be made and should still be considered under the protection of the present disclosure without departing from the principles of the present disclosure.

What is claimed is:

1. A computer-implemented method for virtual machine snapshot backup, comprising:
    dividing a virtual machine snapshot of a virtual machine into one or more child data blocks;
    dividing a respective child data block into one or more data segments;
    applying multilayer de-duplication to the virtual machine snapshot;
    periodically scanning the backup storage file system; and
    based on one or more data repetition characteristics of data storage, extracting data whose repetition rate is higher than a preset threshold into a public data set.

2. The computer-implemented method as recited in claim 1, further comprising storing remaining data in the virtual machine snapshot after applying the multilayer de-duplication.

3. The computer-implemented method as recited in claim 1, wherein the applying the multilayer de-duplication to the virtual machine snapshot comprises:
    applying a child data block de-duplication to the virtual machine snapshot;
    applying a data segment de-duplication to the virtual machine snapshot; and
    applying a public data set de-duplication to the virtual machine snapshot.

4. The computer-implemented method as recited in claim 3, wherein the applying the child data block de-duplication to the virtual machine snapshot comprises:
    determining whether there has been any change of the respective child data block since a preceding backup;
    in response to determining that there has not been any change of the respective child data block since the preceding backup, excluding the respective child data block; and
    in response to determining that there has been a change of the respective child data block since the preceding backup, keeping the respective child data block.

5. The computer-implemented method as recited in claim 3, wherein the applying the data segment de-duplication to the virtual machine snapshot comprises:
    determining whether there has been any change of a respective data segment in the respective child data block that is remaining after applying the child data block de-duplication since a preceding backup; in response to determining that there has not been any change of the respective data segment, excluding the respective data segment; and
    in response to determining that there has been a change of the respective child data block since the preceding backup, keeping the respective data segment.

6. The computer-implemented method as recited in claim 3, wherein the applying the public data set de-duplication to the virtual machine snapshot comprises:

comparing one or more characteristics of a respective data segment that is remaining after applying the data segment de-duplication with one or more characteristics of data in the public data set; and determining whether the respective data segment exists in the public data set; in response to determining that the respective data segments exists in a public data set, excluding the respective data segment; and in response to determining that the respective data segments does not exist in the public data set, keeping the respective data segment.

7. The computer-implemented method as recited in claim 6, wherein the public data set stores one or more data segments whose repetition rates are higher than a preset threshold in a backup storage file system.

8. The computer-implemented method as recited in claim 1, wherein dividing the respective child data block into one or more data segments comprises dividing the respective child data block into one or more data segments with variant lengths or sizes.

9. The computer-implemented method as recited in claim 1, wherein the virtual machine snapshot comprises data fingerprints, sizes, and data points of the one or more child data blocks.

10. The computer-implemented method as recited in claim 1, wherein the respective child data block comprises data fingerprints, sizes, and data points of the one or more data segments.

11. The computer-implemented method as recited in claim 1, further comprising with respect to data excluded by the multilayer de-duplication, using an index of corresponding data in a preceding virtual machine snapshot in a backup of the virtual machine snapshot.

12. A computer-implemented method for virtual machine snapshot backup, comprising:
    dividing a virtual machine snapshot of a virtual machine into one or more child data blocks;
    dividing a respective child data block into one or more data segments;
    applying multilayer de-duplication to the virtual machine snapshot; and
    performing a rollover of the virtual machine snapshot, the performing including:
        reading an index of child data blocks from a backup storage file system according to an index of a to-be-rollover virtual machine snapshot;
        reading data segments according to the index of child data blocks; forming the read data segments into one or more child data blocks; and
        forming the formed one or more child data blocks into the to-be-rollover virtual machine snapshot.

13. The computer-implemented method as recited in claim 12, further comprising:
    by reference to revision information of a current virtual machine mirror file and index information of the to-be-rollover virtual machine snapshot, determining common data in the current virtual machine mirror file and the to-be-rollover virtual machine snapshot is determined, the common data not being read from the backup storage file system.

14. A computer-implemented method for virtual machine snapshot backup, comprising:
    dividing a virtual machine snapshot of a virtual machine into one or more child data blocks;
    dividing a respective child data block into one or more data segments;
    applying multilayer de-duplication to the virtual machine snapshot; and
    performing deleting the virtual machine snapshot, the deleting including:
        writing deletion information of an index of a to-be-deleted virtual machine snapshot of the virtual machine into a log;
        when a volume of the deletion information in the log is larger than a preset threshold, scanning backup data of the virtual machine to find a child data block or a data segment that has not been referenced for a threshold period of time; and
        deleting the child data block or the data segment.

15. A system for virtual machine snapshot backup, comprising:
    a processor; and
    a memory coupled to the processor for storing computer programs to be executed by the processor, wherein the processor is configured to:
    divide a virtual machine snapshot of a virtual machine into one or more child data blocks and to divide a respective child data block into one or more data segments;
    apply multilayer de-duplication to the virtual machine snapshot;
    store remaining data in the virtual machine snapshot after applying the multilayer de-duplication;
    periodically scan the backup storage file system; and
    based on one or more data repetition characteristics of data storage, extract data whose repetition rate is higher than a preset threshold into the public data set.

16. The system as recited in claim 15, wherein the processor is further configured to:
    determine whether there has been any change of the respective child data block since a preceding backup;
    in response to determining that there has not been any change of the respective child data block since the preceding backup, exclude the respective child data block; and
    in response to determining that there has been a change of the respective child data block since the preceding backup, keep the respective child data block.

17. The system as recited in claim 15, wherein the processor is further configured to:
    determine whether there has been any change of a respective data segment in the respective child data block that is remaining after processing of the child data block de-duplication module since a preceding backup;
    in response to determining that there has not been any change of the respective data segment, exclude the respective data segment; and
    in response to determining that there has been a change of the respective child data block since the preceding backup, keep the respective data segment.

18. The system as recited in claim 15, wherein the processor is further configured to:
    compare one or more characteristics of a respective data segment that is remaining after applying the data segment de-duplication with one or more characteristics of data in a public data set; and
    determine whether the respective data segment exists in the public data set;
    in response to determining that the respective data segments exists in a public data set, exclude the respective data segment; and in response to determining that the respective data segments does not exist in the public data set, keep the respective data segment.

\* \* \* \* \*